(12) United States Patent
Tsuchimochi

(10) Patent No.: US 10,490,032 B2
(45) Date of Patent: Nov. 26, 2019

(54) PRODUCT REGISTRATION APPARATUS FOR DETERMINING A CORRECT PRODUCT, CONTROL METHOD, AND PROGRAM

(71) Applicant: NEC CORPORATION, Tokyo (JP)

(72) Inventor: Kazuki Tsuchimochi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/562,210

(22) PCT Filed: Mar. 23, 2016

(86) PCT No.: PCT/JP2016/059097
§ 371 (c)(1),
(2) Date: Sep. 27, 2017

(87) PCT Pub. No.: WO2016/158595
PCT Pub. Date: Oct. 6, 2016

(65) Prior Publication Data
US 2018/0114413 A1 Apr. 26, 2018

(30) Foreign Application Priority Data
Mar. 31, 2015 (JP) .................................. 2015-072039

(51) Int. Cl.
| G07G 1/00 | (2006.01) |
| G06K 7/10 | (2006.01) |
| G06T 7/62 | (2017.01) |
| G06T 7/50 | (2017.01) |
| G06K 9/00 | (2006.01) |

(52) U.S. Cl.
CPC ....... *G07G 1/0063* (2013.01); *G06K 7/10762* (2013.01); *G06K 7/10861* (2013.01);
(Continued)

(58) Field of Classification Search
None
See application file for complete search history.

(56) References Cited

U.S. PATENT DOCUMENTS 9,330,474 B1* 5/2016 Shekar ...................... G06T 7/60
2008/0027817 A1 1/2008 Iizaka et al.
(Continued)

FOREIGN PATENT DOCUMENTS

| CN | 101470929 A | 7/2009 |
| CN | 103810468 A | 5/2014 |

(Continued)

OTHER PUBLICATIONS

International Search Report for PCT/JP2016/059097 dated Jun. 21, 2016.
(Continued)

*Primary Examiner* — Idowu O Osifade
(74) *Attorney, Agent, or Firm* — Sughrue Mion, PLLC

(57) ABSTRACT

An information processing apparatus (10), having a function of registering a product to be checked out, includes an image recognition unit (110) that recognizes, by using an image associated with depth information indicating a depthwise distance of a product included in an imaging range, a size or shape of the product within the image, a code acquisition unit (122) that acquires a product identification code of a product to be checked out, a size/shape information acquisition unit (130) that acquires size/shape information linked with the acquired product identification code, and a determination unit (140) that determines, by calculating a difference between the size or shape of the product recognized from the image and the size/shape information acquired using the product identification code, whether the difference satisfies a predetermined reference.

9 Claims, 14 Drawing Sheets

(52) U.S. Cl.
CPC .................. *G06K 9/00* (2013.01); *G06T 7/50* (2017.01); *G06T 7/62* (2017.01); *G07G 1/0072* (2013.01); *G06T 2207/10048* (2013.01); *G06T 2207/30204* (2013.01); *G06T 2207/30232* (2013.01)

(56) References Cited

U.S. PATENT DOCUMENTS

| | | |
|---|---|---|
| 2014/0064570 A1 | 3/2014 | Miyakoshi |
| 2014/0126773 A1 | 5/2014 | Miyakoshi et al. |

FOREIGN PATENT DOCUMENTS

| | | |
|---|---|---|
| CN | 104361693 A | 2/2015 |
| JP | 2002-216131 A | 8/2002 |
| JP | 2008-027427 A | 2/2008 |
| JP | 2010-237886 A | 10/2010 |
| JP | 2013-182323 A | 9/2013 |
| JP | 2014-052806 A | 3/2014 |
| JP | 2014-092975 A | 5/2014 |
| JP | 2014-132501 A | 7/2014 |

OTHER PUBLICATIONS

Communication dated Feb. 5, 2019 from Japanese Patent Office in counterpart JP Application No. 2015-072039.
Communication dated May 31, 2019 from the State Intellectual Property Office of the P.R.C. in application No. 201680020276.3.

\* cited by examiner

| PRODUCT IDENTIFICATION CODE | SIZE/SHAPE INFORMATION | ... |
|---|---|---|
| 001 | SIZE : ○○○, SHAPE : CYLINDRICAL | |
| 002 | SIZE : ×××, SHAPE : SPHERICAL | |
| ⋮ | ⋮ | |

| PRODUCT IDENTIFICATION CODE | WEIGHT | WEIGHT DEVIATION | ... |
|---|---|---|---|
| 001 | 250g | ±5% | |
| 002 | 80g | ±0.5% | |
| 003 | — | — | |
| 004 | 200g | ±0.5% | |
| ⋮ | ⋮ | ⋮ | |

PRODUCT REGISTRATION APPARATUS FOR DETERMINING A CORRECT PRODUCT, CONTROL METHOD, AND PROGRAM

CROSS REFERENCE TO RELATED APPLICATIONS

This application is a National Stage of International Application No. PCT/JP2016/059097 filed Mar. 23, 2016, claiming priority based on Japanese Patent Application No. 2015-072039 filed Mar. 31, 2015, the contents of all of which are incorporated herein by reference in their entirety.

TECHNICAL FIELD

The present invention relates to a technique for determining whether a product recognized by an apparatus is the correct product.

BACKGROUND ART

There is a technique for determining the validity of a product recognized by an apparatus for registering a product to be checked out, the determination being performed when the apparatus recognizes the product to be checked out using a code for identifying a product such as the so-called barcode, by providing a weight sensor at a location where the recognized product is temporarily loaded. The term "validity" as used herein refers to the correct recognition of a product purchased by a customer in the apparatus for registering products to be checked out. In such a technique, it is determined whether the weight measured by the weight sensor matches the weight of a product linked with a product identification code based on both the weights.

Another example of a technique for properly determining the validity of a product recognized by an apparatus for registering products to be checked out is disclosed in, for example, Patent Document 1. Patent Document 1 discloses a technique of acquiring, in accordance with reading a barcode for identifying a product, an image of an object (product) attached with the barcode and a basic diagram of the product associated with the barcode, and determining the validity of the recognized product by a correlation value calculated using the shape of the object recognized from the image and the basic diagram linked with the read barcode.

Patent Document 2 and Patent Document 3 disclose a technique for identifying a product through object recognition based on an image. Specifically, Patent Document 2 and Patent Document 3 disclose a technique in which a product image is linked with a product ID, the product image and an object included in a captured image are matched with each other on the basis of the hue of its surface, a pattern, a surface state such as irregularities of its surface, or the feature amount such as a shape, and a candidate of a product corresponding to the object within the image is determined by the degree of similarity therebetween. In addition, Patent Document 3 discloses a technique for detecting a region corresponding to a person's hand from an image using a thermo camera with the use of far-infrared rays, and performing the above-described feature amount matching, exclusive of the region.

RELATED DOCUMENTS

Patent Documents

[Patent Document 1] Japanese Unexamined Patent Application Publication No. 2014-132501

[Patent Document 2] Japanese Unexamined Patent Application Publication No. 2013-182323

[Patent Document 3] Japanese Unexamined Patent Application Publication No. 2014-052806

SUMMARY OF THE INVENTION

Technical Problem

It is more preferable that the accuracy of a technique for determining the validity of a product recognized by an apparatus that registers a product to be checked out, as described above, becomes higher.

An object of the present invention is to provide a technique for accurately determining the validity of a product recognized by an apparatus that registers a product to be checked out.

Solution to Problem

According to the present invention, there is provided a product registration apparatus including: an image recognition unit that recognizes, using an image associated with depth information indicating a depthwise distance of a product included in an imaging range, a size or shape of the product within the image; a code acquisition unit that acquires a product identification code of a product to be checked out; a size/shape information acquisition unit that acquires size/shape information linked with the acquired product identification code; and a determination unit that determines whether the size or shape of the product recognized from the image and the size/shape information acquired using the product identification code satisfy a predetermined reference.

According to the present invention, there is provided a control method executed by a computer, the method including: recognizing, using an image associated with depth information indicating a depthwise distance of a product included in an imaging range, a size or shape of the product within the image; acquiring a product identification code of a product to be checked out; acquiring size/shape information linked with the acquired product identification code; and determining, by calculating a difference between the size or shape of the product recognized from the image and the size/shape information acquired using the product identification code, whether the difference satisfies a predetermined reference.

According to the present invention, there is provided a program causing a computer to function as: an image recognition unit that recognizes, using an image associated with depth information indicating a depthwise distance of a product included in an imaging range, a size or shape of the product within the image; a code acquisition unit that acquires a product identification code of a product to be checked out; a size/shape information acquisition unit that acquires size/shape information linked with the acquired product identification code; and a determination unit that determines, by calculating a difference between the size or shape of the product recognized from the image and the size/shape information acquired using the product identification code, whether the difference satisfies a predetermined reference.

Advantageous Effects of Invention

According to the present invention, it is possible to accurately determine the validity of a product recognized by an apparatus that registers products to be checked out.

BRIEF DESCRIPTION OF THE DRAWINGS

The above and other objects, features and advantages will be made clearer from certain preferred exemplary embodiments described below, and the following accompanying drawings.

FIG. 2 is a diagram illustrating an example of information which is stored by a size/shape information storage unit.

FIG. 9 is a diagram illustrating an example of information which is stored by a weight information storage unit.

DESCRIPTION OF EMBODIMENTS

Figure 1:
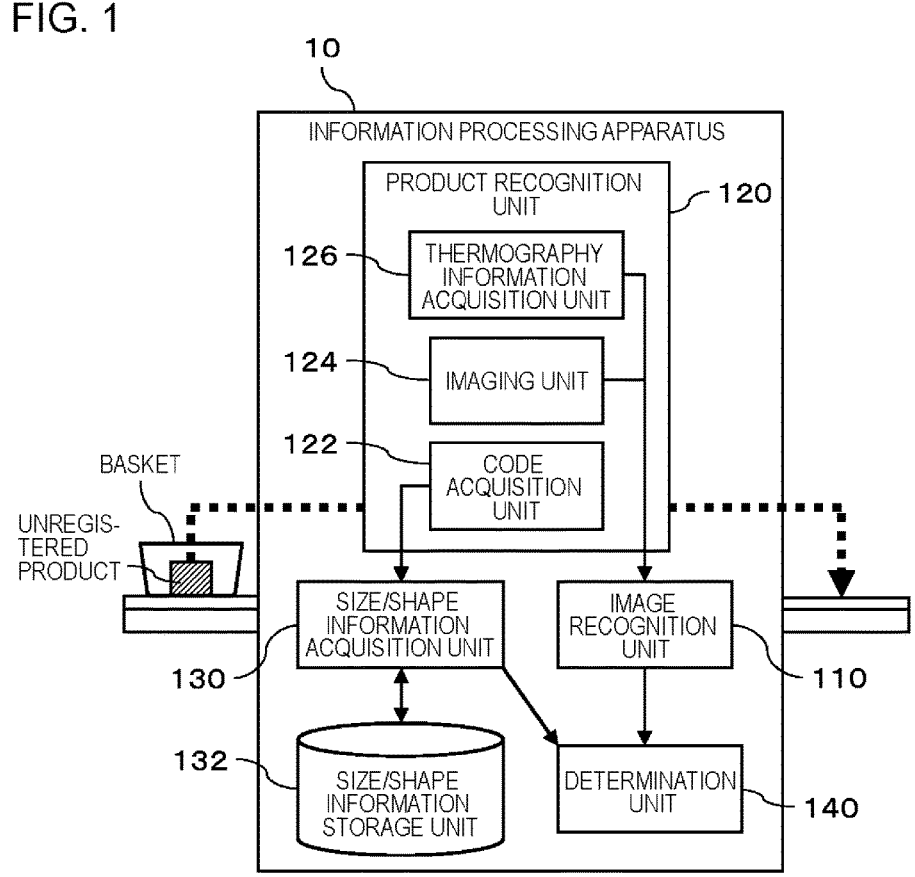
FIG. 1 is a diagram conceptually illustrating a process configuration of an information processing apparatus in a first exemplary embodiment.

Hereinafter, an exemplary embodiment of the present invention will be described with reference to the accompanying drawings. In all the drawings, like elements are referenced by like reference numerals and the descriptions thereof will not be repeated.

First Exemplary Embodiment

[Process Configuration]

FIG. 1 is a diagram conceptually illustrating a process configuration of an information processing apparatus 10 in a first exemplary embodiment. The information processing apparatus 10 is a product registration apparatus such as a so-called point of sales (POS) terminal having at least a function of registering a product to be checked out. The information processing apparatus 10 may further have a function of settling a payment of a registered product. The information processing apparatus 10 of the present exemplary embodiment includes an image recognition unit 110, a product recognition unit 120 (a code acquisition unit 122, an imaging unit 124, and a thermography information acquisition unit 126), a size/shape information acquisition unit 130, a size/shape information storage unit 132, and a determination unit 140.

<Registration of Product to be Checked Out>

In the present exemplary embodiment, a product to be checked out is registered as follows.

A product to be checked out is moved as shown by the dotted line of FIG. 1. That is, a product before being registered as a product to be checked out (hereinafter, such a product is denoted as an "unregistered product") is extracted from an area for temporarily loading unregistered products, and is moved to the position of the product recognition unit 120. Here, as described later in detail, the unregistered product is registered as a product to be checked out. A product registered to be checked out (hereinafter, such a product is denoted as a "registered product") is moved to an area for temporarily loading registered products.

The unregistered product is registered as a product to be checked out as follows, for example. First, the code acquisition unit 122 of the product recognition unit 120 acquires a product identification code of the unregistered product, held over the product recognition unit 120, as a product identification code of a product to be checked out. Here, the product identification code refers to data which is formed of characters, numbers, signs or the like determined in advance in order to determine each product. A price look up (PLU) code (such as, for example, a Japan Article Number (JAN) code), a Non-PLU code, or the like may be used in the product identification code.

The product identification code is acquired by detecting and analyzing a product information symbol from a product to be checked out. The product information symbol is for determining information related to a product. Here, the symbol refers to a barcode, a two-dimensional code (such as a QR code (Registered Trademark)), a character string symbol, or the like. Note that a numerical sequence is also included in the character string as used herein. The product information symbol is a barcode having information for determining product information (such as an ID of product information) encoded therein, a character string symbol indicating information for determining product information, or the like. In this case, the product identification code is acquired from the product information symbol, for example, by using a code reader including a light source and a light receiving element such as a photodiode, a code reader including a lens and an imaging element such as a charge coupled device (CCD) image sensor, or the like. In addition, in a case of the code reader including a lens and an imaging element, the feature amount (such as, for example, color, shape, package, or specific mark or character string for identifying a product) of a product to be checked out is extracted from an image including the product, and a matching process is performed by referring to a storage unit (not shown) that stores the product identification code and the feature amount of the product in association with each other, whereby it is also possible to acquire the product identification code.

The product recognition unit 120 uses a product identification code acquired by the code acquisition unit 122, to refer to a storage unit (not shown) that stores the product identification code linked with product information (such as, for example, a product name, a unit price of a product, or the presence or absence of a discount by a percentage or a discount by an amount), and to read out the product information linked with the acquired product identification code.

The product recognition unit 120 adds the read-out product information as information to be used in a checkout process executed by the information processing apparatus 10. Thereby, a product before registration is recognized in the information processing apparatus 10, and is registered as a product to be checked out.

<Validity Determination of Product Recognized in Apparatus>

In addition, in the present exemplary embodiment, as described above, the validity of a product registered to be checked out is determined by each processing unit described below. Note that the term "validity" in the present exemplary embodiment refers to the correct recognition of a product purchased by a customer in the information processing apparatus 10.

The imaging unit 124 is a so-called 3D camera or the like, and is configured to be capable of generating an image in association with depth information indicating the depthwise distance of a product (unregistered product) included in an imaging range. The imaging unit 124 generates the image and the depth information in association with each other, through a well-known method, for example, such as using a parallax in a stereo camera. The imaging unit 124 of the present exemplary embodiment includes the vicinity of the product recognition unit 120 in an imaging range, and is configured such that the direction or position thereof is adjusted so as to be capable of capturing an image of an unregistered product moved to the product recognition unit 120. Note that the imaging unit 124 may be integrally included with the information processing apparatus 10 such as, for example, a camera or the like used when object recognition is performed on a product, and may be installed in the vicinity of the information processing apparatus 10 such as, for example, an external camera or the like.

In addition, the imaging unit 124 preferably captures an image in accordance with a timing at which the code acquisition unit 122 reads the product identification code. For example, in a case where the presence or the like of the product information symbol of a product is detected, the code acquisition unit 122 sends a notification to that effect to the imaging unit 124. Upon receiving the notification, the imaging unit 124 is able to know the timing at which the code acquisition unit 122 reads the code. With such a configuration, in a case of a product having the above-described product information symbol or the like, when the imaging unit 124 captures an image at a timing at which the code acquisition unit 122 reads the product identification code, the attitude of the product included in the image is stabilized, and a change in the attitude for each acquired image is reduced. This makes it possible to expect an effect of reducing a processing load by reducing the number of templates used in image matching, an effect of improving recognition accuracy in the image matching, and the like.

The thermography information acquisition unit 126 is a so-called thermography camera or the like using infrared rays or the like, and is configured to capture infrared radiation energy radiated by an object included in an imaging range, and to generate thermography information indicating the temperature distribution of the object. The thermography information acquisition unit 126 is configured to acquire the thermography information at the imaging timing of the imaging unit 124. In addition, the thermography information acquisition unit 126 is adjusted in the position or direction thereof so as to be capable of acquiring the thermography information in the same imaging range as the imaging range of the imaging unit 124 or in an imaging range including the imaging range of the imaging unit 124.

The thermography information acquisition unit 126 matches the positions of the image generated by the imaging unit 124 and the thermography information through, for example, a coordinate transformation process or the like of an image space. In this manner, the thermography information acquisition unit 126 acquires the thermography information associated with the image generated by the imaging unit 124.

The image recognition unit 110 performs the following process using the image generated by the imaging unit 124 and the thermography information acquired by the thermography information acquisition unit 126.

The image recognition unit 110 detects, for example, an edge or the like of a product within the image by performing a well-known image recognition process on the image generated by the imaging unit 124. The image recognition unit 110 matches, for example, a shape shown by the detected edge with pre-set template data of a two-dimensional shape or a three-dimensional shape, and recognizes a shape having the highest degree of similarity as the shape of the product. Further, the image recognition unit 110 calculates, for example, the actual size (such as, for example, height, width, depthwise width, or area of each surface) of a product within the image, using depth information associated with the image generated by the imaging unit 124 and the size of a region occupied by the product within the image. Since the actual distance from the imaging apparatus to the product can be known on the basis of the depth information, the image recognition unit 110 can convert the size of a region occupied by the product within the image to the actual size of the product, on the basis of the distance.

In addition, the image recognition unit 110 excludes a region estimated to be a person from the shape of the product recognized from the image generated by the imaging unit 124, using the thermography information acquired by the thermography information acquisition unit 126. For example, information indicating, for example, the range of a person's body temperature (for example, 35 to 40° C.) is set in advance in the image recognition unit 110, and the image recognition unit 110 extracts a region indicating the set temperatures from the thermography information. The image recognition unit 110 excludes a region corresponding to the extracted region from a region to be subjected to edge detection processing, on the basis of a positional relationship between the thermography information acquired by the thermography information acquisition unit 126 and the image generated by the imaging unit 124, or excludes the region corresponding to the extracted region from the recognized shape, on the basis of the detected edge. Thereby, the image recognition unit 110 can recognize a more accurate region as a region corresponding to a product, from the image generated by the imaging unit 124, and can more accurately calculate, as a result, the actual size of the product converted from the region.

The size/shape information acquisition unit 130 uses the product identification code acquired by the code acquisition unit 122, to refer to the size/shape information storage unit 132, and to acquire size/shape information linked with the product identification code. The size/shape information refers to information indicating the size (such as, for example, height, width, and depth of a product, and area of each surface calculated therefrom) of each product and the outer shape of each product. For example, as shown in FIG. 2, the size/shape information storage unit 132 stores the product identification code linked with the size/shape information. FIG. 2 is a diagram illustrating an example of information stored by the size/shape information storage unit 132. The information stored by the size/shape information storage unit 132 is not limited to the example of FIG. 2.

The size/shape information acquisition unit 130 searches the size/shape information storage unit 132, to detect the same product identification code as the product identification code acquired by the code acquisition unit 122, and acquires the size/shape information linked with the detected product identification code. Note that, in the example of FIG. 1, an example is shown in which the size/shape information storage unit 132 is included in the information processing apparatus 10, but the size/shape information storage unit 132 may be included in other apparatuses capable of communicating with the information processing apparatus 10. In this case, the size/shape information acquisition unit 130 communicates with the other apparatuses, to thereby acquire the size/shape information linked with the product identification code acquired by the code acquisition unit 122.

The determination unit 140 determines whether the size or shape recognized from the image generated by the imaging unit 124 and the size/shape information acquired using the product identification code satisfy a predetermined reference. Here, the predetermined reference is related to the size or shape of a product, and allows to confirm that a product recognized from the image and a product identified from the product identification code indicate the same product. For example, the determination unit 140 calculates the degree of similarity between the size and shape following a predetermined similarity calculation algorithm related to size and shape, and determines whether the degree of similarity is equal to or greater than a predetermined reference value (threshold set in advance as a value indicating the same product).

As a result of determination, in a case where the matching degree between the both is equal to or greater than the predetermined reference value, there is a high possibility that the product moved to the position of the product recognition unit 120 and the product recognized by the information processing apparatus 10 are the same as each other, and the determination unit 140 can determine the recognition result performed by the information processing apparatus 10 to be valid. On the other hand, in a case where the matching degree between the both is less than the predetermined reference value, there is a high possibility that the product moved to the position of the product recognition unit 120 and the product recognized by the information processing apparatus 10 are different from each other, and the determination unit 140 can determine the recognition result performed by the information processing apparatus 10 to be invalid. In addition, in this case, it may be considered that some kind of defect has occurred such as, for example, a reading error of a code or an erroneous attachment of a code. Consequently the determination unit 140 may be configured to display a message for urging rereading of a product, a predetermined warning message, or the like on a display unit of the information processing apparatus 10, or to output such a message through a sound, in a case where the matching degree between the both is less than the predetermined reference value.

Note that, in the present exemplary embodiment, the size/shape information storage unit 132 may store each product identification code linked with a plurality of items of size/shape information. Specifically, the size/shape information storage unit 132 may store items of size/shape information indicating the attitudes of a product when seen from a plurality of directions such as, for example, size/shape information when seen from the front, size/shape information when seen from above, and size/shape information when seen from diagonally above, linked with each product identification code. In this case, the determination unit 140 calculates the degree of similarity in the size or shape recognized by the image recognition unit 110 with respect to each of the plurality of items of size/shape information linked with each product identification code, and determines whether the matching degree between the both is equal to or greater than the predetermined reference value. In this manner, a reduction can be suppressed in accuracy of determination performed by the determination unit 140 due to the attitude of the product included in the image generated by the imaging unit 124.

[Hardware Configuration]

Figure 3:
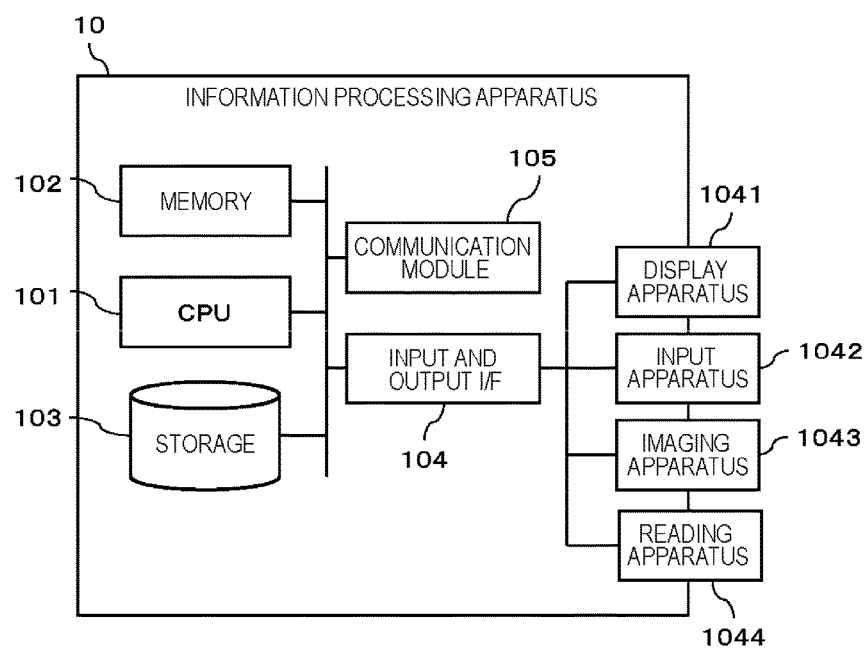
FIG. 3 is a diagram conceptually illustrating a hardware configuration of the information processing apparatus.

FIG. 3 is a diagram conceptually illustrating a hardware configuration of the information processing apparatus 10. As shown in FIG. 3, the information processing apparatus 10 includes a CPU 101, a memory 102, a storage 103, an input and output interface (input and output I/F) 104, a communication module 105, and the like.

The CPU 101, the memory 102, the storage 103, the input and output interface 104, and the communication module 105 are connected to each other by a data transmission channel for mutually transmitting and receiving data.

The memory 102 is a memory such as, for example, a random access memory (RAM) or a read only memory (ROM). The storage 103 is a storage apparatus such as, for example, a hard disk, a solid state drive (SSD), or a memory card. The storage 103 stores program modules for implementing functions of respective processing units including the image recognition unit 110, the product recognition unit 120, the code acquisition unit 122, the imaging unit 124, the thermography information acquisition unit 126, the size/shape information acquisition unit 130, and the determination unit 140 of the information processing apparatus 10. The CPU 101 implements the functions of the respective processing units by executing these respective program modules. When the CPU 101 executes the respective modules, these modules may be read out on the memory 102 and then be executed, and may be executed without being read out on the memory 102. In addition, the storage 103 also functions as the size/shape information storage unit 132.

The input and output interface 104 is connected to a display apparatus 1041, an input apparatus 1042, an imaging apparatus 1043, a reading apparatus 1044, and the like. The display apparatus 1041 is an apparatus, such as a liquid crystal display (LCD) or a cathode ray tube (CRT) display, which displays a screen corresponding to drawing data processed by the CPU 101, a graphics processing unit (GPU) (not shown) or the like. One or more display apparatuses 1041 can be connected to the input and output interface 104. The input apparatus 1042 is an apparatus that receives an input by an operator's operation, and is implemented as, for example, a keyboard, a mouse, a touch sensor, or the like. The display apparatus 1041 and input apparatus 1042 may be integrally formed and implemented as a touch panel. The imaging apparatus 1043 is a so-called 3D camera or the like, and includes a monocular imaging module or a binocular imaging module (not shown). In this case, the imaging apparatus 1043 can implement the function of the imaging unit 124 described above. In addition, the imaging apparatus 1043 is a so-called thermography camera or the like, and includes an imaging module (not shown) that detects infrared energy radiated from an object, and generates an image indicating the temperature distribution of an object by the amount of the infrared energy. In this case, the imaging apparatus 1043 can implement the function of the thermography information acquisition unit 126 described above. The reading apparatus 1044 is an apparatus such as a code reader including a light source and a light receiving element such as a photodiode, or a code reader including a lens and an imaging element such as a charge coupled device (CCD) image sensor. The reading apparatus 1044 can implement the function of the code acquisition unit 122 described above.

The communication module 105 is used for transmitting and receiving data to and from an external apparatus or the like. Note that there are various methods of connecting the information processing apparatus 10 and the external apparatus through the communication module 105. For example, this connection is bus connection through a bus line (for example, universal serial bus (USB) line), network connection through a network line, or the like. Note that the network line may be a wireless line and may be a wired line.

Note that the hardware configuration of the information processing apparatus 10 is not limited to the configuration shown in FIG. 3. For example, various apparatuses (such as a money injection apparatus or a change payout apparatus) required for a process of checking out a product may be connected to the input and output interface 104.

Operation Example

Figure 4:
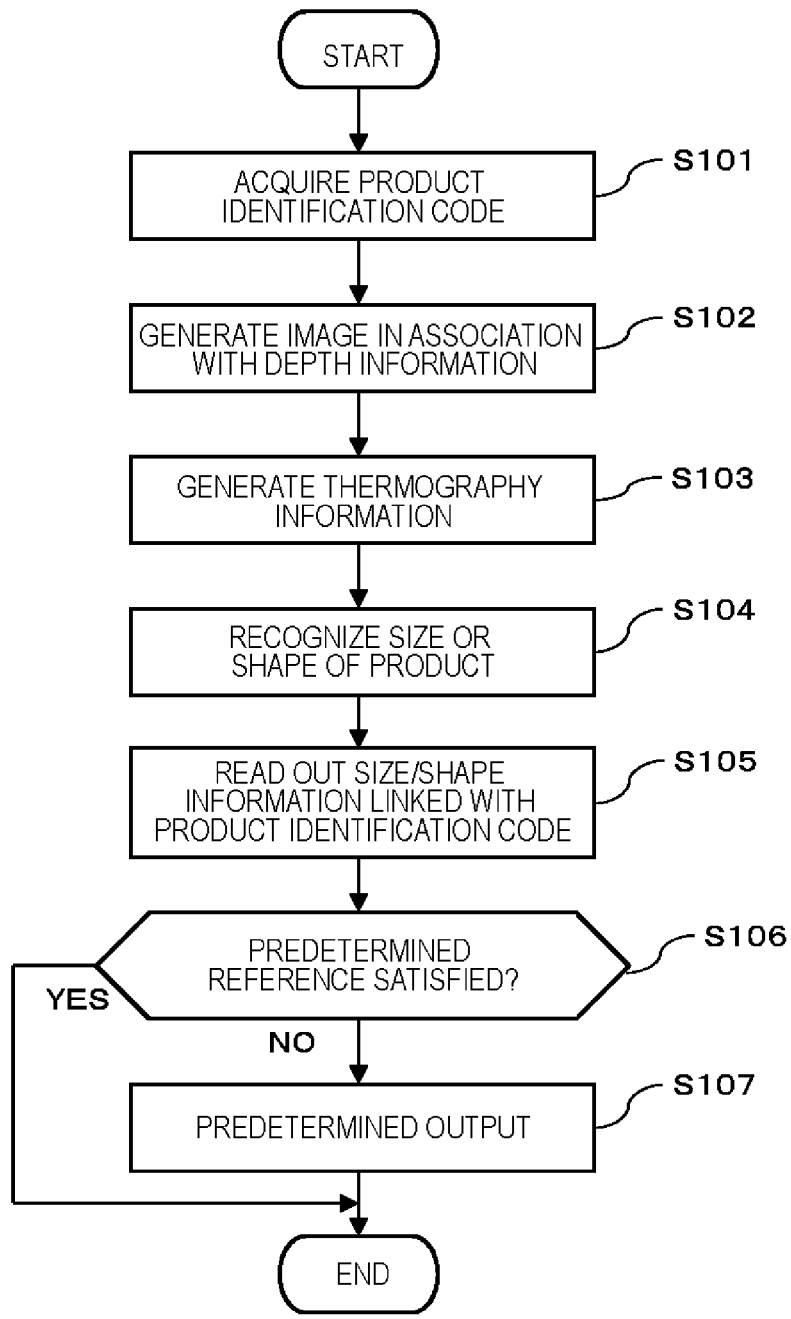
FIG. 4 is a flow diagram illustrating a processing flow of the information processing apparatus of the first exemplary embodiment.

An operation example of the information processing apparatus 10 of the present exemplary embodiment will be described with reference to FIG. 4. FIG. 4 is a flow diagram illustrating a processing flow of the information processing apparatus 10 of the first exemplary embodiment.

When a product is moved to the position of the product recognition unit 120, the code acquisition unit 122 acquires the product identification code of the product (S101). In addition, the imaging unit 124 generates an image of the product in association with depth information indicating a depthwise distance, in accordance with the acquisition of the product identification code (S102), and the thermography information acquisition unit 126 acquires the thermography information in association with the image generated by the imaging unit 124 (S103).

The image recognition unit 110 recognizes the size or shape of the product, using the generated image and the depth information and thermography information associated with the image (S104). For example, the image recognition unit 110 uses an actual distance to the product obtained from the depth information, to convert the size of a region occupied by the product within the image to the actual size of the product. In addition, for example, the image recognition unit 110 uses a well-known image recognition process such as edge processing, to extract the region of the product from the image, and to acquire the shape of the region as the shape of the product.

In addition, the size/shape information acquisition unit 130 uses the product identification code acquired by the code acquisition unit 122, to refer to the size/shape information storage unit 132, and reads out size/shape information linked with the product identification code from the size/shape information storage unit 132 (S105).

The determination unit 140 compares the size or shape of the product recognized by the image recognition unit 110 with the size/shape information linked with the product identification code, and determines whether a predetermined reference is satisfied (S106). For example, the determination unit 140 can calculate the degree of similarity between the both following a predetermined similarity calculation algorithm, and determine whether the both satisfy the predetermined reference depending on whether the degree of similarity is equal to or greater than a predetermined threshold. In a case where it is determined that the predetermined reference is satisfied (S106: YES), the determination unit 140 determines the product has been normally recognized by the information processing apparatus 10, and does not execute the process of S107 described later. On the other hand, in a case where it is determined that the predetermined reference is not satisfied (S106: NO), the determination unit 140 outputs a predetermined output (such as, for example, a message for urging rereading of the product, a warning message, or a warning sound) through a display, a speaker or the like not shown in the drawing (S107).

Advantageous Effect of First Exemplary Embodiment

As stated above, according to the present exemplary embodiment, the degree of similarity between the actual size or shape of the product calculated from the image and the size/shape information indicating the size or shape of the product linked with the product identification code of the product is calculated with respect to the product read by the product recognition unit 120. Whether the both satisfy the predetermined reference is determined depending on whether the degree of similarity between the both is equal to or greater than a predetermined threshold (threshold set in advance as a value regarded to be the same product). In a case where the sizes or shapes of the both substantially match each other, and the predetermined reference is satisfied, there is high possibility that the product moved to the position of the product recognition unit 120 and the product recognized by the information processing apparatus 10 are the same as each other, and the recognition result performed by the information processing apparatus 10 is determined to be valid by the determination unit 140. On the other hand, in a case where the sizes or shapes of the both do not match each other, and the predetermined reference is not satisfied, there is high possibility that the product moved to the position of the product recognition unit 120 and the product recognized by the information processing apparatus 10 are different from each other, and the recognition result performed by the information processing apparatus 10 is determined to be invalid by the determination unit 140. In this manner, the actual size of or shape of the product recognized from the image and the theoretical size or shape of the product linked with the product identification code are compared with each other, and thus it is possible to accurately determine the validity of the product recognized by the information processing apparatus 10.

Second Exemplary Embodiment

There is also an operating method of attaching an apparatus for reading a product to be checked out to a basket carried by a customer containing a product to be purchased, registering the product as a product to be checked out when the product is put into the basket, and performing only payment settlement at a register terminal. In such a case, the basket is provided with an apparatus having the same configuration as that of the information processing apparatus 10 of the first exemplary embodiment, and thus it is possible to obtain the same effect as that in the first exemplary embodiment.

[Process Configuration/Hardware Configuration]

Similarly to the configuration shown in FIG. 1, the information processing apparatus 10 of the present exemplary embodiment includes the image recognition unit 110, the product recognition unit 120 (code acquisition unit 122, imaging unit 124, and thermography information acquisition unit 126), the size/shape information acquisition unit 130, the size/shape information storage unit 132, and the determination unit 140. In addition, the information processing apparatus 10 of the present exemplary embodiment also has the same hardware configuration as that of the first exemplary embodiment, and implements each processing unit as is the case with the first exemplary embodiment. However, each hardware component of the information processing apparatus 10 shown in FIG. 4 is smaller in size than in the first exemplary embodiment, in order to attach a basket 20.

Figure 5:
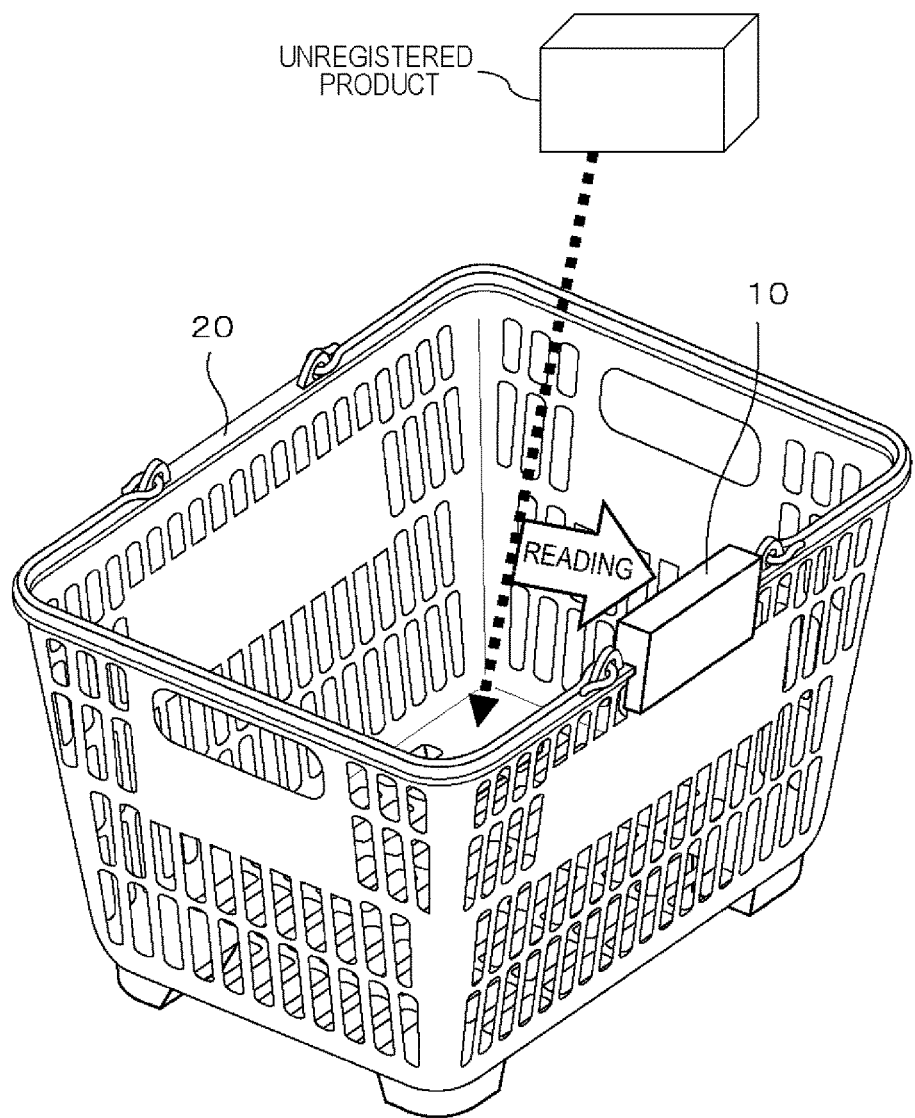
FIG. 5 is a diagram illustrating an example of attaching an information processing apparatus in a second exemplary embodiment.

FIG. 5 is a diagram illustrating an attachment example of the information processing apparatus 10 in a second exemplary embodiment. The information processing apparatus 10 is attached to the basket 20 as shown in FIG. 5. As shown in FIG. 5, an unregistered product is registered as a product to be checked out in the information processing apparatus 10, and then is placed in the basket 20.

Operation Example

As shown in FIG. 4, the information processing apparatus 10 of the present exemplary embodiment operates similarly to the information processing apparatus 10 of the first exemplary embodiment.

Advantageous Effect of Second Exemplary Embodiment

As stated above, in the present exemplary embodiment, it is also possible to obtain the same advantageous effect as in first exemplary embodiment.

Third Exemplary Embodiment

The present exemplary embodiment is the same as the first exemplary embodiment and the second exemplary embodiment, except that the information processing apparatus 10 further includes a number acquisition unit 150.

[Process Configuration]

Figure 6:
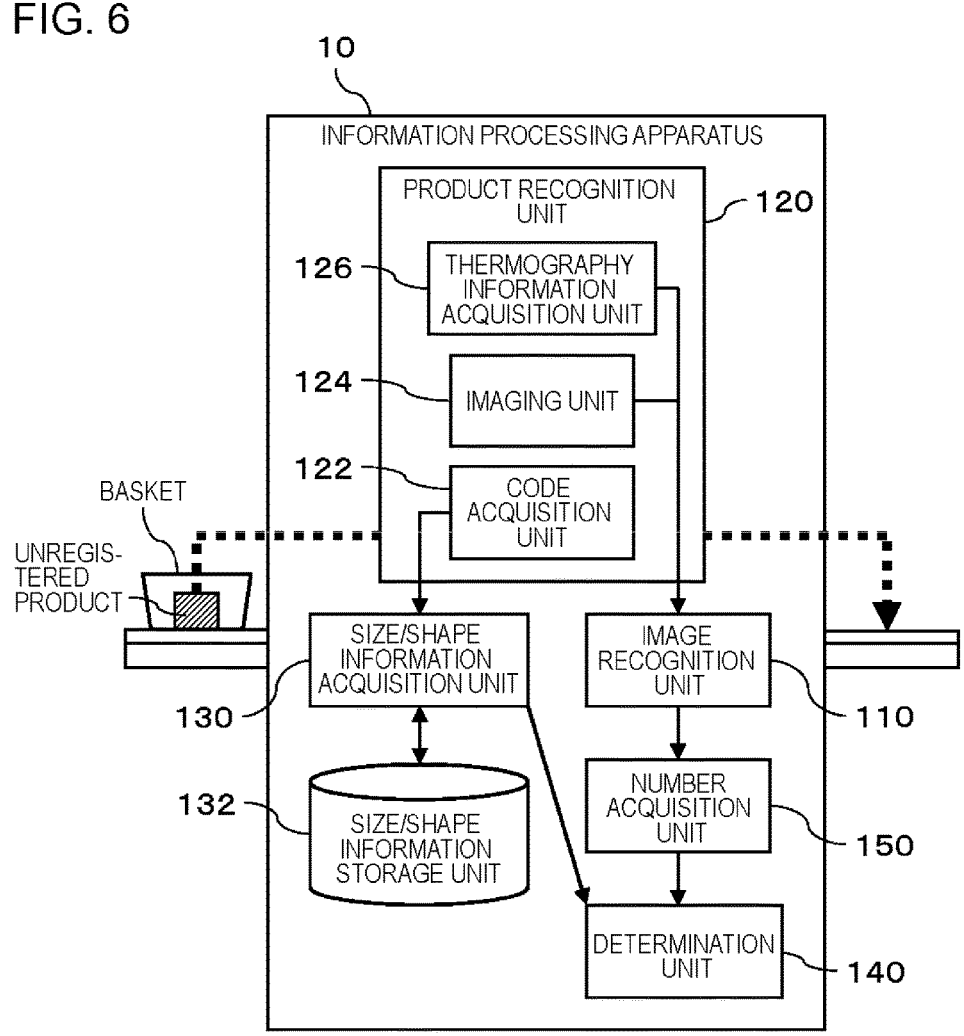
FIG. 6 is a diagram conceptually illustrating a process configuration of an information processing apparatus in a third exemplary embodiment.

FIG. 6 is a diagram conceptually illustrating a process configuration of an information processing apparatus 10 in a third exemplary embodiment. As shown in FIG. 6, the information processing apparatus 10 of the present exemplary embodiment further includes the number acquisition unit 150.

The number acquisition unit 150 acquires the number of products included in the imaging range of the image generated by the imaging unit 124. Specifically, the number acquisition unit 150 acquires the number of shapes of the products recognized by the image recognition unit 110, as the number of products. Alternatively, the number acquisition unit 150 acquires the number of objects detected within an image by pattern matching of feature amounts of products stored in advance, as the number of products.

The determination unit 140 of the present exemplary embodiment determines whether the number of product identification codes acquired by the code acquisition unit 122 and the number of products acquired by the number acquisition unit 150 match each other. Note that the term "match" herein means a complete match. In the present exemplary embodiment, in a case where a plurality of product information symbols are present within an image, the code acquisition unit 122 performs, for example, an image recognition process, to detect each product information symbol, and to acquire a plurality of product identification codes at substantially the same timing. The code acquisition unit 122 of the present exemplary embodiment further notifies the determination unit 140 of the number of product identification codes acquired here.

[Hardware Configuration]

As is the case with the first exemplary embodiment and the second exemplary embodiment, the information processing apparatus 10 of the present exemplary embodiment also has the hardware configuration as shown in FIG. 4. The storage 103 further stores a program module for implementing the function of the number acquisition unit 150, and the number acquisition unit 150 is implemented by the CPU 101 executing the program module.

Operation Example

Figure 7:
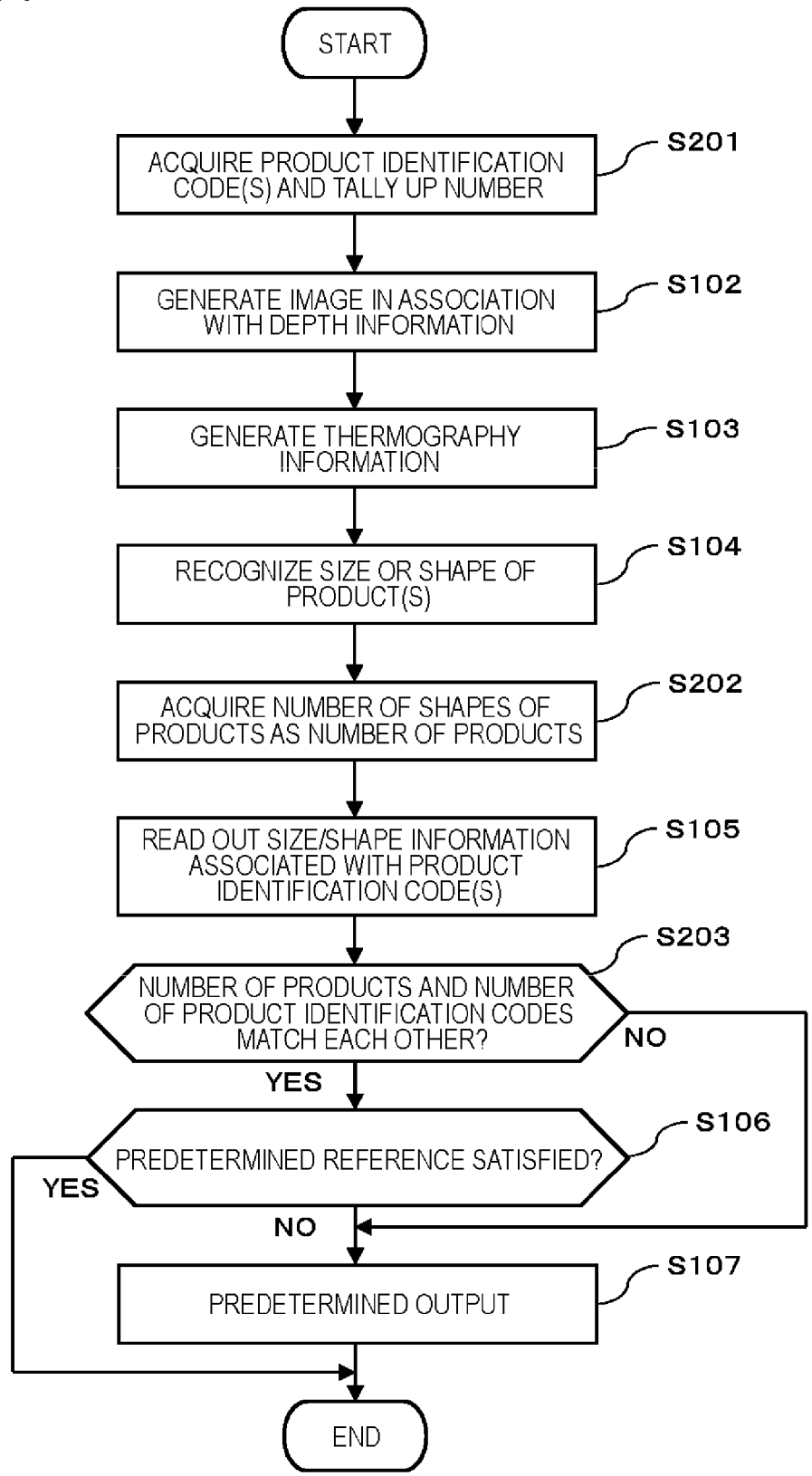
FIG. 7 is a flow diagram illustrating a processing flow of the information processing apparatus of the third exemplary embodiment.

An operation example of the information processing apparatus 10 of the present exemplary embodiment will be described with reference to FIG. 7. FIG. 7 is a flow diagram illustrating a processing flow of the information processing apparatus 10 of the third exemplary embodiment. Note that, hereinafter, processes (S201 to S203) different from those in the first exemplary embodiment and the second exemplary embodiment will be mainly described.

When acquiring the product identification code, the code acquisition unit 122 tallies up the number of acquired product identification codes (S201). The number acquisition unit 150 acquires the number of shapes of the products recognized by the image recognition unit 110, as the number of products included in the image generated by the imaging unit 124 (S202). In addition, the determination unit 140 compares the number of product identification codes tallied up in S201 with the number of acquired products in S202, and checks whether the both match each other (S203). In a case where the number of products and the number of product identification codes do not match each other (S203: NO), the determination unit 140 determines that some kind of error such as a reading error of the product has occurred, and displays a predetermined message or the like such as, for example, a message for urging rereading of the product or a warning message on a display, or outputs such a message as sound information (S107). On the other hand, in a case where the number of products and the number of product identification codes match each other (S203: YES), the determination unit 140 determines that an error such as a reading error of a product has not occurred, and checks whether the size or shape obtained from the image and the size/shape information obtained from the product identification code satisfy the predetermined reference, as described in detail in the first exemplary embodiment (S106).

Advantageous Effect of Third Exemplary Embodiment

As stated above, in the present exemplary embodiment, it is further determined whether the number of products recognized from the image and the actually-recognized number of product identification codes in the information processing apparatus 10 match each other. Thereby, according to the present exemplary embodiment, it is possible to determine whether an error such as a reading error of a product has occurred, and to urge an accurate recognition of a product in the information processing apparatus 10 in a case where such an error has occurred.

Fourth Exemplary Embodiment

In the present exemplary embodiment, a description will be given of an aspect in which the information processing apparatus 10 described in the respective exemplary embodiments is combined with a technique using a weight sensor.

When determining the validity of a product recognized in the information processing apparatus 10 based on the weight of the product measured by the weight sensor and the weight of the product linked with the product identification code, a correct determination result may not be obtained in a case where the weight of the product is extremely light, in a case where a variation in weight occurs in the same product, or the like. In a case where determination is to be made on such a product, the information processing apparatus 10 of the present exemplary embodiment determines the validity of recognition based on the size or shape of the product recognized from the image and the size/shape information acquired from the product identification code, as described in the above-described respective exemplary embodiments.

[Process Configuration]

Figure 8:
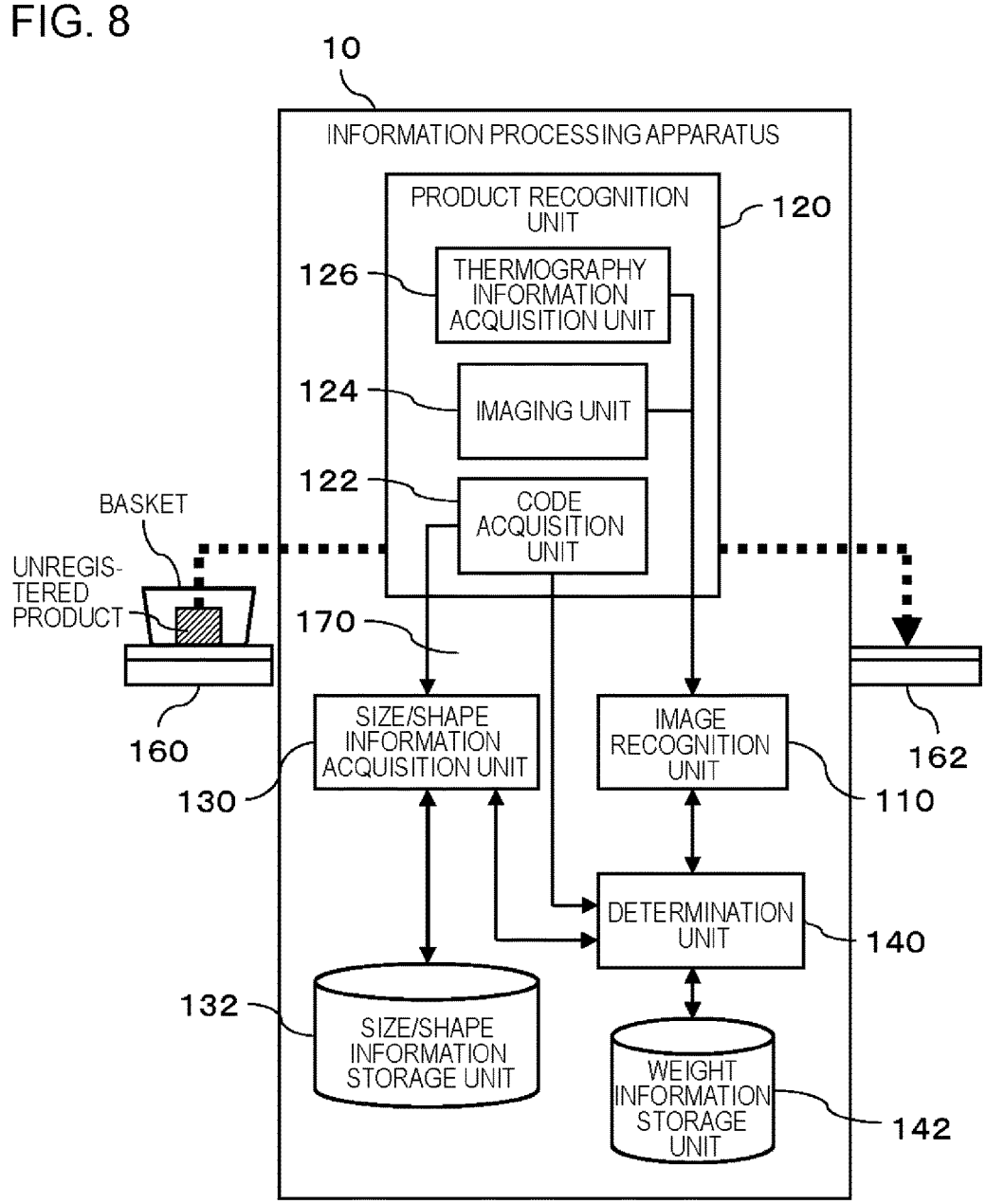
FIG. 8 is a diagram conceptually illustrating a process configuration of an information processing apparatus in a fourth exemplary embodiment.

FIG. 8 is a diagram conceptually illustrating a process configuration of an information processing apparatus 10 in a fourth exemplary embodiment. Note that the information processing apparatus 10 of the present exemplary embodiment includes weight sensors (160 and 162) in the loading area of an unregistered product and the loading area of a registered product, respectively, and basically determines the validity of the product recognized in the information processing apparatus 10 in accordance with the amount of change in weight measured by these weight sensors.

As shown in FIG. 8, the information processing apparatus 10 of the present exemplary embodiment further includes a weight information storage unit 142. The weight information storage unit 142 stores, linked with the product identification code, at least one of information indicating a weight per product of the product identification code (hereinafter, denoted as weight information) and information indicating weight deviation of the product (hereinafter, denoted as weight deviation information). FIG. 9 shows an example of information stored by the weight information storage unit 142. FIG. 9 is a diagram illustrating an example of information stored by the weight information storage unit 142. In the example of FIG. 9, the weight information storage unit 142 stores the weight information and the weight deviation information linked with the product identification code.

The determination unit 140 of the present exemplary embodiment acquires a product identification code from the code acquisition unit 122, and uses the product identification code to acquire, from the weight information storage unit 142, the weight information or the weight deviation information linked with the product identification code acquired by the code acquisition unit 122. In a case where the weight information storage unit 142 stores information as shown in FIG. 9, the determination unit 140 can acquire the weight information and the weight deviation information. The determination unit 140 determines whether at least any one of conditions (1) to (3) is satisfied based on the acquire weight information or weight deviation information: (1) the weight linked with the acquired product identification code is equal to or greater than a reference value, (2) the weight linked with the acquired product identification code is not set, and (3) the weight deviation linked with the acquired product identification code is equal to or greater than a predetermined threshold.

These conditions are for determining whether the product of the product identification code acquired by the code acquisition unit 122 is unsuitable for a process performed by the weight sensor. The above (1) is a condition for determining whether the product is extremely light, for example, since a product having a light weight and generating only a small amount of change in weight detected by the weight sensor is prone to erroneous recognition in the process performed by the weight sensor. In addition, the above (2) is a condition for determining whether the weight of the product has been set, since when the weight is not set, the process by the weight sensor cannot be performed in the first place. In addition, the above (3) is a condition for determining whether the product is largely varied in weight, since such a product is prone to erroneous recognition in the process performed by the weight sensor.

In a case where it is determined that the product corresponds to any of the above (1) to (3), the determination unit 140 of the present exemplary embodiment makes a determination described in the above-described respective exemplary embodiments, that is, executes a process of determining the validity of recognition performed by the information processing apparatus 10 using the size or shape of the product. Specifically, in a case where it is determined that the product corresponds to any of the above (1) to (3), the determination unit 140 of the present exemplary embodiment notifies the image recognition unit 110 and the size/shape information acquisition unit 130 of a request for execution of the process described in the above-described respective exemplary embodiments. The image recognition unit 110 having received this notification sends, to the determination unit 140, the size or shape of the product recognized from the image generated by the imaging unit 124. In addition, the code acquisition unit 122 having received this notification sends, to the determination unit 140, the size/shape information linked with the product identification code acquired by the code acquisition unit 122. The determination unit 140 uses the size or shape of the product received from the image recognition unit 110 and the size/shape information received from the size/shape information acquisition unit 130, to execute a determination process as described in the above-described respective exemplary embodiments.

[Hardware Configuration]

As is the case with the first exemplary embodiment and the second exemplary embodiment, the information processing apparatus 10 of the present exemplary embodiment also has the hardware configuration as shown in FIG. 4. The storage 103 further stores a program module for implementing the function of the determination unit 140 of the present exemplary embodiment, and the determination unit 140 of the present exemplary embodiment is implemented by the CPU 101 executing the program module. In addition, the storage 103 can implement the function of the weight information storage unit 142.

Operation Example

Figure 10:
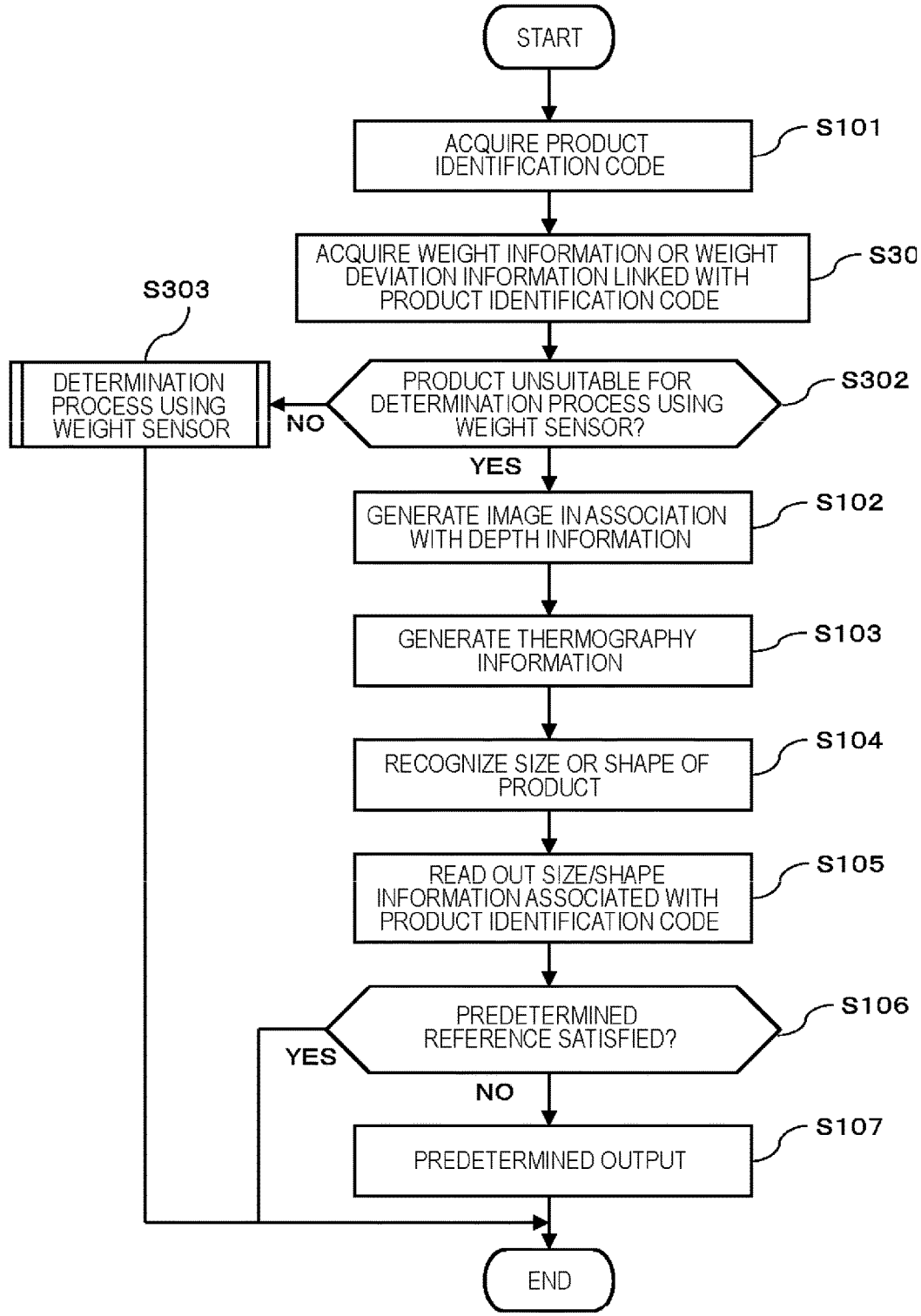
FIG. 10 is a flow diagram illustrating a processing flow of the information processing apparatus of the fourth exemplary embodiment.

An operation example of the information processing apparatus 10 of the present exemplary embodiment will be described with reference to FIG. 10. FIG. 10 is a flow diagram illustrating a processing flow of the information processing apparatus 10 of the fourth exemplary embodiment. Note that, in the following description, processes (S301 to S303) added in the present exemplary embodiment will be mainly described on the basis of the flow diagram of FIG. 4.

The determination unit 140 uses the product identification code acquired by the code acquisition unit 122 in S101, to refer to the weight information storage unit 142, and acquires the weight information or the weight deviation information linked with the product identification code (S301). The determination unit 140 uses the acquired weight information or weight deviation information, to determine whether the product of the product identification code acquired by the code acquisition unit 122 in S101 is a product unsuitable for the determination process using the weight sensor (S302). Specifically, the determination unit 140 determines whether at least any one of conditions (1) to (3) is satisfied: (1) the weight linked with the acquired product identification code is equal to or greater than a reference value, (2) the weight linked with the acquired product identification code is not set, and (3) the weight deviation linked with the acquired product identification code is equal to or greater than a predetermined threshold.

In a case where the product of the product identification code acquired by the code acquisition unit 122 in S101 is a product unsuitable for the determination process using the weight sensor (S302: YES), the determination unit 140 notifies the image recognition unit 110 and the size/shape information acquisition unit 130 to that effect, and the processes described in the first exemplary embodiment are executed (S102 to S107). On the other hand, in a case where the product of the product identification code acquired by the code acquisition unit 122 in S101 is a product suitable for the determination process using the weight sensor (S302: NO), the determination process using the weight sensor is executed (S303).

Advantageous Effect of Fourth Exemplary Embodiment

As stated above, in the present exemplary embodiment, it is determined whether the product of the product identification code acquired by the code acquisition unit 122 is unsuitable for the determination process using the weight sensor. In a case where it is determined that the product of the product identification code acquired by the code acquisition unit 122 is unsuitable for the determination process using the weight sensor, a determination process based on the size or shape of the product recognized from the image and the size/shape information linked with the product identification code is executed. Thereby, it is possible to prevent erroneous recognition which may occur when using the weight sensor or the like, and to improve the determination accuracy of validity of a product recognized in the information processing apparatus 10.

Modification Example of Fourth Exemplary Embodiment

In the present exemplary embodiment, an example is shown in which the determination unit 140 basically performs a determination process based on the amount of change in weight measured by the weight sensor, and performs a determination process based on the size or shape recognized from an image on a product satisfying a predetermined condition. However, without being limited thereto, the determination unit 140 may be configured to basically perform a determination process based on the size or shape recognized from an image, and for a product satisfying a condition different from the predetermined condition, the determination unit 140 may perform a determination process based on the amount of change in weight measured by the weight sensor. Herein, the wording "product satisfying a different condition" refers to a product such as, for example, a thin product that is not thick, which has the possibility of many feature points being recognized depending on its direction or attitude, and is unsuitable for an image recognition process. In such a case, the information processing apparatus 10 stores the product identification code of the product unsuitable for the image recognition process in a storage unit not shown, and in a case where the same product identification code as the product identification code stored in the storage unit is acquired by the code acquisition unit 122, the determination unit 140 determines the validity of a product recognized in the information processing apparatus 10, based on a change in weight measured by the weight sensor.

Fifth Exemplary Embodiment

In the present exemplary embodiment, an information processing apparatus 10 having a minimum configuration capable of obtaining the effect of the present invention will be described. A separate apparatus (for example, a server apparatus) from an apparatus that registers a product to be checked out (hereinafter, denoted as a product registration apparatus) is provided so as to be capable of communicating with the product registration apparatus through, for example, a local area network (LAN).

[Process Configuration]

Figure 11:
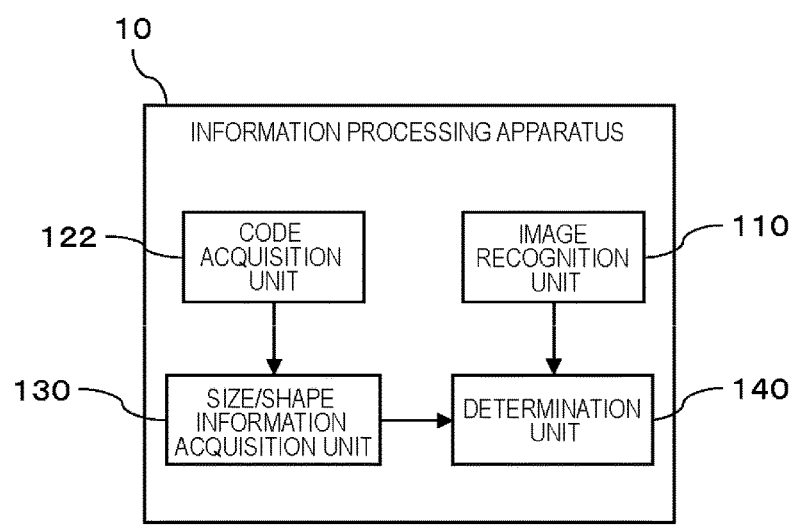
FIG. 11 is a diagram conceptually illustrating a process configuration of an information processing apparatus in a fifth exemplary embodiment.

FIG. 11 is a diagram conceptually illustrating a process configuration of the information processing apparatus 10 in the fifth exemplary embodiment. As shown in FIG. 11, the information processing apparatus 10 of the present exemplary embodiment includes an image recognition unit 110, a code acquisition unit 122, a size/shape information acquisition unit 130, and a determination unit 140.

The image recognition unit 110 uses an image associated with depth information indicating the depthwise distance of a product included in an imaging range, to recognize the size or shape of the product within the image. The code acquisition unit 122 and the size/shape information acquisition unit 130 acquire size/shape information linked with the acquired product identification code. The determination unit 140 determines whether the size or shape of the product recognized from the image and the size/shape information acquired using the product identification code satisfies a predetermined reference.

[Hardware Configuration]

The information processing apparatus 10 of the present exemplary embodiment has the hardware configuration as shown in FIG. 3. Note that the imaging apparatus 1043 and the reading apparatus 1044 are not connected to the input and output interface 104 of the information processing apparatus 10 of the present exemplary embodiment, and the information processing apparatus 10 may be configured to acquire the image or the product identification code from another apparatus through the communication module 105. As is the case with the above-described respective exemplary embodiments, the image recognition unit 110, the code acquisition unit 122, the size/shape information acquisition unit 130, and the determination unit 140 of the present exemplary embodiment are implemented by the CPU 101 executing the program module for implementing the function of the each processing unit.

Operation Example

Figure 12:
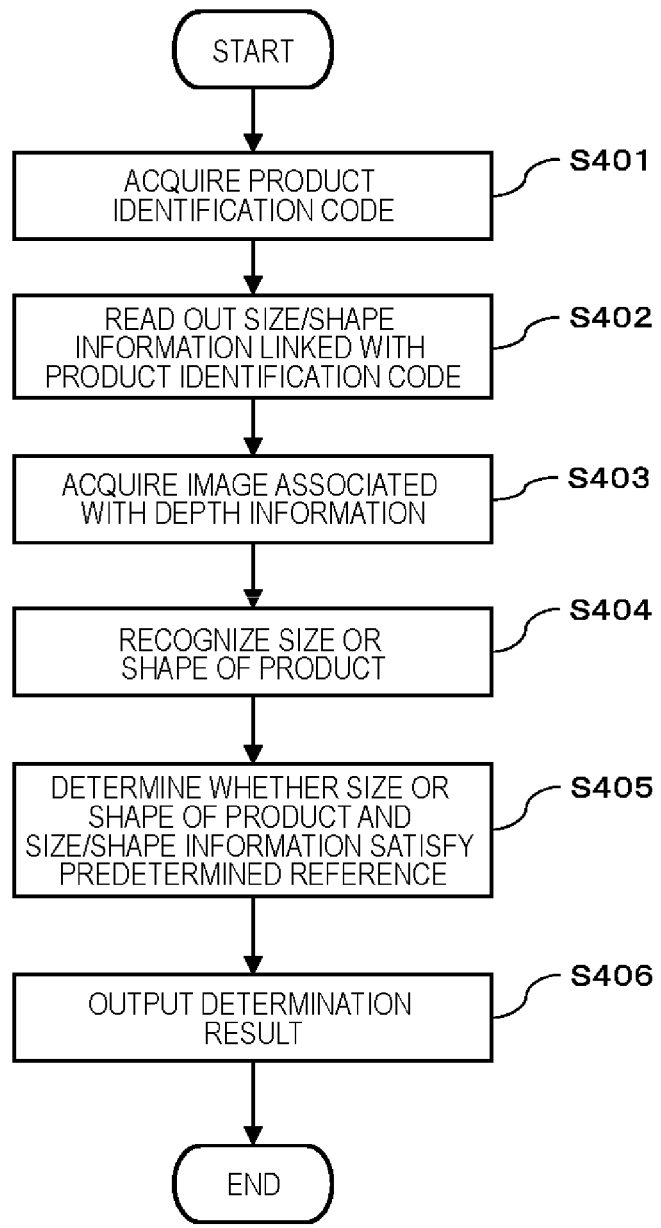
FIG. 12 is a flow diagram illustrating a processing flow of the information processing apparatus of the fifth exemplary embodiment.

An operation example of the information processing apparatus 10 of the present exemplary embodiment will be described with reference to FIG. 12. FIG. 12 is a flow diagram illustrating a processing flow of the information processing apparatus 10 of the fifth exemplary embodiment.

The code acquisition unit 122 communicates with the product registration apparatus through a network such as, for example, a LAN, and acquires the product identification code of a product to be checked out read by the product registration apparatus (S401). The size/shape information acquisition unit 130 uses the product identification code acquired in S401, to read out the size/shape information linked with the product identification code (S402). In the present exemplary embodiment, the size/shape information is stored, linked with the product identification code, in a storage unit, for example (not shown) or the like of another apparatus capable of communicating the information processing apparatus 10.

In addition, the image recognition unit 110 communicates with the product registration apparatus through a network such as, for example, a LAN, and acquires an image generated by an imaging unit or the like provided in the product registration apparatus (S403). The imaging unit provided in this product registration apparatus is a so-called 3D camera capable of generating an image and depth information in association with each other. The image recognition unit 110 recognizes the shape of a product within an image using a well-known image recognition process, and calculates the actual size of the product on the basis of the depth information associated with the image and the size of a region of the product within the image (S404).

The determination unit 140 determines whether the size/shape information acquired in S402 and the size and shape of the product acquired in S404 satisfy a predetermined reference (S405), and transmits the result to the product registration apparatus (S406).

Advantageous Effect of Fifth Exemplary Embodiment

As stated above, in the present exemplary embodiment, the actual size of or shape of the product recognized from the image and the theoretical size or shape of the product linked with the product identification code are compared with each other. Thereby, it is possible to accurately determine the validity of the product recognized by the product registration apparatus.

Sixth Exemplary Embodiment

In the present exemplary embodiment, a description will be given of a checkout system including a product registration apparatus that performs a registration process of a product to be checked out and a checkout apparatus that performs a process of settling a payment of a product registered to be checked out.

[System Configuration]

Figure 13:
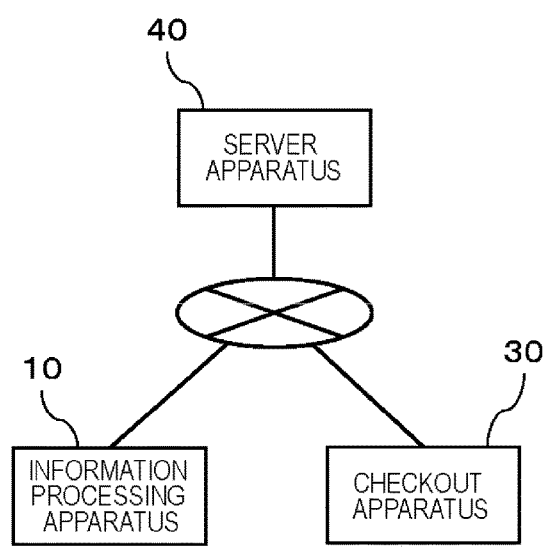
FIG. 13 is a diagram conceptually illustrating a system configuration of a checkout system in a sixth exemplary embodiment.

FIG. 13 is a diagram conceptually illustrating a system configuration of a checkout system 1 in a sixth exemplary embodiment. As shown in FIG. 13, the checkout system 1 includes an information processing apparatus 10 functioning as a product registration apparatus, a checkout apparatus 30 that performs a process of settling a payment of a product registered in the information processing apparatus 10, and a server apparatus 40. In this case, the information processing apparatus 10, the checkout apparatus 30, and the server apparatus 40 are communicably connected to each other through a network such as a LAN. In addition, the information processing apparatus 10 has the same configuration as that of any one of the first to fourth exemplary embodiments. In the following description, a case is illustrated in which the information processing apparatus 10 of the present exemplary embodiment has the configuration of FIG. 1 as is the case with the first exemplary embodiment. Note that, not being limited to the example of FIG. 13, the image recognition unit 110, the code acquisition unit 122, the size/shape information acquisition unit 130, and the determination unit 140 of the information processing apparatus 10 may be provided so as to communicate with the product registration apparatus through, for example, a LAN or the like, as a separate apparatus (for example, server apparatus 40) from the product registration apparatus, as described in the fifth exemplary embodiment. In this case, the product registration apparatus includes a processing unit that acquires the product identification code from a product information symbol or the like, separately from the code acquisition unit 122 of the information processing apparatus 10.

Operation Example

Figure 14:
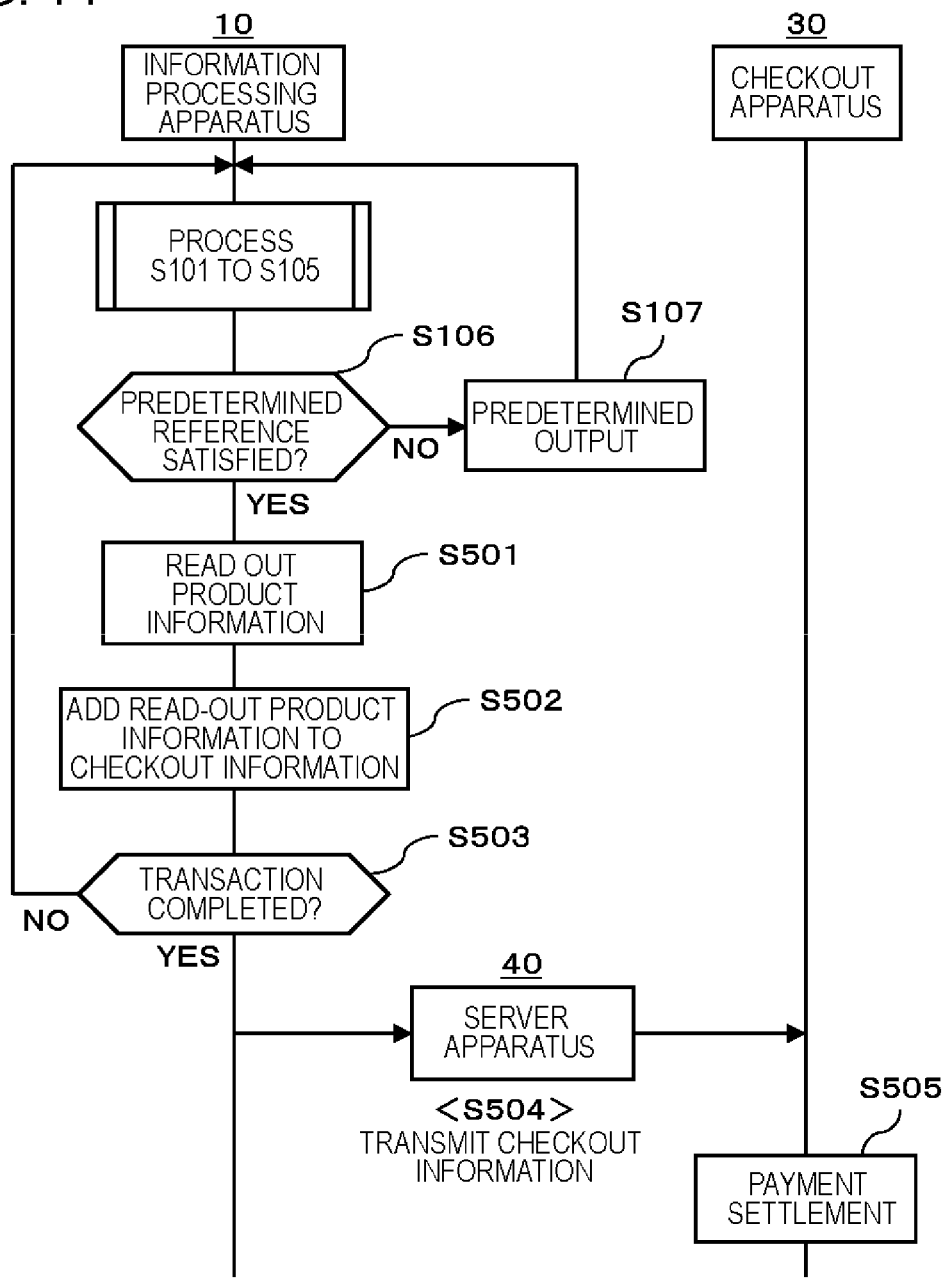
FIG. 14 is a sequence diagram illustrating a processing flow of the checkout system of the sixth exemplary embodiment.

A processing flow of the checkout system 1 of the present exemplary embodiment will be described with reference to FIG. 14. FIG. 14 is a sequence diagram illustrating a processing flow of the checkout system 1 in the sixth exemplary embodiment.

The information processing apparatus 10 executes the processes of S101 to S105 of the flow diagram of FIG. 4, as described in the first exemplary embodiment. The determination of S106 of the flow diagram of FIG. 4 is performed. In a case where the determination unit 140 determines that the size/shape information and the size and shape of the product do not satisfy a predetermined reference (S106: NO), the determination unit 140 performs a predetermined output (for example, an output for urging re-recognition of a product) (S107), and the processes of S101 to S105 are executed again. On the other hand, in a case where the determination unit 140 determines that the size/shape information and the size and shape of the product satisfy the predetermined reference (S106: YES), the product recognition unit 120 determines that the product has been normally recognized by the information processing apparatus 10 and reads out the product information linked with the product identification code acquired by the code acquisition unit 122 (S501). Specifically, the product recognition unit 120 uses the product identification code acquired by the code acquisition unit 122, to refer to a storage unit (not shown) that stores the product identification code linked with product information (such as, for example, a product name, a unit price of a product, or the presence or absence of price cut or discount), and reads out the product information linked with the acquired product identification code. The product recognition unit 120 adds the read-out product information as information to be used in a checkout process (hereinafter, denoted as checkout information) executed by the information processing apparatus 10 (S502). The checkout information includes at least the name of each product to be checked out, the unit price and number of each product to be checked out, the total payment amount of all the products to be checked out, and the like. The processes of S101 to S107, S501, and S502 are repeated until the registration of products to be checked out in one transaction is completed (S503: NO). The information processing apparatus 10 detects an event such as, for example, pressing down of a "subtotal" button performed on an input apparatus provided in the information processing apparatus 10, and detects that the registration of products to be checked out in one transaction is completed.

In a case where it is detected that the registration of products to be checked out in one transaction is completed (S503: YES), the information processing apparatus 10 transmits the checkout information of the transaction generated in S502 to the checkout apparatus 30 through the server apparatus 40 (S504). The information processing apparatus 10 identifies the checkout apparatus 30 to which the checkout information is to be transmitted, for example, by an operator's input operation of the information processing apparatus 10, and transmits the checkout information. In this case, the information processing apparatus 10 transmits the checkout information and information for specifying the checkout apparatus 30 which is a transmission destination of the checkout information to the server apparatus 40. The server apparatus 40 transmits the checkout information to the checkout apparatus 30 specified by the information processing apparatus 10, and the checkout apparatus 30 performs a process of settling a payment using the checkout information transmitted from the server apparatus 40 (S505). In addition, without being limited thereto, the information processing apparatus 10 may transmit the checkout information to, for example, the server apparatus 40, dispense a portable medium including information for identifying the checkout information and is readable by the checkout apparatus 30 to a customer, and cause an arbitrary checkout apparatus 30 to read the portable medium through the customer's operation. In this case, the checkout apparatus 30 uses identification information included in the portable medium, to read out the checkout information from the server apparatus 40, and performs a process of settling the payment (S505).

As described above, although the exemplary embodiments of the present invention have been set forth with reference to the accompanying drawings, the exemplary embodiments are merely illustrative of the present invention, and various configurations other than those stated above may be adopted.

For example, in the first exemplary embodiment or the like, the imaging unit 124 may be configured to acquire an image when a product is extracted from the loading area of an unregistered product (such as, for example, a basket) to be held over the product recognition unit 120, and the image recognition unit 110 may be configured to recognize the size or shape of the product from the image. In this case, it is possible to determine whether the unregistered product extracted from the loading area and the product registered to be checked out actually match each other. In addition, for example, the imaging unit 124 may be configured to acquire an image when the registered product is placed in the loading area, and the image recognition unit 110 may be configured to recognize the size or shape of the product from the image. In this case, it is possible to determine whether the registered product placed in the loading area and the product registered to be checked out actually match each other. In this manner, it is possible to discover an illegal act such as switching of products during product registration, and to determine whether the recognized product is the correct product.

In addition, in a plurality of flow diagrams or sequence diagrams using the aforementioned description, a plurality of processes are described in order, but the execution order of processes which are executed in each exemplary embodiment is not limited to the described order. In each exemplary embodiment, the order of processes shown can be changed within a range without causing any problem in terms of contents. In addition, each exemplary embodiment described above can be combined in a range consistent with the contents thereof.

Hereinafter, examples of reference forms are appended.

1. A product registration apparatus including:
an image recognition unit that recognizes, using an image associated with depth information indicating a depthwise distance of a product included in an imaging range, a size or shape of the product within the image;
a code acquisition unit that acquires a product identification code of a product to be checked out;
a size/shape information acquisition unit that acquires size/shape information linked with the acquired product identification code; and
a determination unit that determines whether the size or shape of the product recognized from the image and the size/shape information acquired using the product identification code satisfy a predetermined reference.

2. The product registration apparatus according to 1, further including a thermography information acquisition unit that acquires thermography information in association with the image,
wherein the image recognition unit excludes a portion of the image estimated to be a person from the shape of the product recognized from the image by using the acquired thermography information.

3. The product registration apparatus according to 1 or 2,
wherein the product identification code is linked with a plurality of items of the size/shape information, and
the determination unit determines whether the predetermined reference is satisfied with respect to the recognized size or shape and each of the plurality of items of size/shape information.

4. The product registration apparatus according to any one of 1 to 3, further including an imaging unit that captures the image in accordance with a timing at which the code acquisition unit reads the product identification code.

5. The product registration apparatus according to any one of 1 to 4, further including a number acquisition unit that acquires the number of products included in the imaging range,
wherein the determination unit determines whether the acquired number of product identification codes match the acquired number of products.

6. The product registration apparatus according to any one of 1 to 5,
wherein the product identification code is further linked with a weight or a weight deviation of the product of the product identification code, and
the determination unit executes the determination in at least any one of:
a case where the weight linked with the acquired product identification code is equal to or greater than a reference value;
a case where the weight linked with the acquired product identification code is not set; and
a case where the weight deviation linked with the acquired product identification code is equal to or greater than a predetermined threshold.

7. A control method, executed by a computer, the method including:

recognizing, using an image associated with depth information indicating a depthwise distance of a product included in an imaging range, a size or shape of the product within the image;

acquiring a product identification code of a product to be checked out;

acquiring size/shape information associated with the acquired product identification code; and determining, by calculating a difference between the size or shape of the product recognized from the image and the size/shape information acquired using the product identification code, whether the difference satisfies a predetermined reference.

8. The control method according to 7 executed by the computer, further including:

acquiring thermography information in association with the image; and excluding a portion of the image estimated to be a person from the shape of the product recognized from the image by using the acquired thermography information.

9. The control method according to 7 or 8, wherein the product identification code is linked with a plurality of items of the size/shape information, the method executed by the computer, further including determining whether the predetermined reference is satisfied with respect to the recognized size or shape and each of the plurality of items of size/shape information.

10. The control method according to any one of 7 to 9 executed by the computer, further including capturing the image in accordance with a timing at which the product identification code is read.

11. The control method according to any one of 7 to 10 executed by the computer, further including:

acquiring the number of products included in the imaging range; and determining whether the acquired number of product identification codes match the acquired number of products.

12. The control method according to any one of 7 to 11, wherein the product identification code is further linked with a weight or a weight deviation of the product of the product identification code, the method executed by the computer, further including executing the determination in at least any one of:

a case where the weight linked with the acquired product identification code is equal to or greater than a reference value;

a case where the weight linked with the acquired product identification code is not set; and a case where the weight deviation linked with the acquired product identification code is equal to or greater than a predetermined threshold.

13. A program for causing a computer to function as:

an image recognition unit that recognizes, using an image associated with depth information indicating a depthwise distance of a product included in an imaging range, a size or shape of the product within the image;

a code acquisition unit that acquires a product identification code of a product to be checked out;

a size/shape information acquisition unit that acquires size/shape information linked with the acquired product identification code; and a determination unit that determines, by calculating a difference between the size or shape of the product recognized from the image and the size/shape information acquired using the product identification code, whether the difference satisfies a predetermined reference.

14. The program according to 13, causing the computer to further function as:

a thermography information acquisition unit that acquires thermography information in association with the image; and the image recognition unit that excludes a portion of the image estimated to be a person from the shape of the product recognized from the image by using the acquired thermography information.

15. The program according to 13 or 14, wherein the product identification code is linked with a plurality of items of the size/shape information, the program causing the computer to further function as the determination unit that determines whether the predetermined reference is satisfied with respect to the recognized size or shape and each of the plurality of items of size/shape information.

16. The program according to any one of 13 to 15, causing the computer to further function as an imaging unit that captures the image in accordance with a timing at which the code acquisition unit reads the product identification code.

17. The program according to any one of 13 to 16, causing the computer to further function as:

a number acquisition unit that acquires the number of products included in the imaging range; and the determination unit that determines whether the acquired number of product identification codes match the acquired number of products.

18. The program according to any one of 13 to 17, wherein the product identification code is further linked with a weight or weight deviation of the product of the product identification code, the program causing the computer to further function as the determination unit that executes the determination in at least any one of:

a case where the weight linked with the acquired product identification code is equal to or greater than a reference value;

a case where the weight linked with the acquired product identification code is not set; and a case where the weight deviation linked with the acquired product identification code is equal to or greater than a predetermined threshold.

The invention claimed is:

1. A product registration apparatus comprising:
a memory storing instructions; and
a processor configured to execute the instructions to implement:
an image recognition unit that recognizes, using an image associated with depth information indicating a depthwise distance of a product included in an imaging range, a size or shape of the product within the image;
a code acquisition unit that acquires a product identification code of a product to be checked out;
a size/shape information acquisition unit that acquires size/shape information linked with the acquired product identification code; and
a determination unit that determines whether the size or shape of the product recognized from the image and the size/shape information acquired using the product identification code satisfy a predetermined reference.

2. The product registration apparatus according to claim 1, wherein the processor is further configured to execute the instructions to implement a thermography information acquisition unit that acquires thermography information in association with the image, wherein the image recognition unit excludes a portion of the image estimated to be a person from the shape of the product recognized from the image by using the acquired thermography information.

3. The product registration apparatus according to claim 1, wherein the product identification code is linked with a plurality of items of the size/shape information, and the determination unit determines whether the predetermined reference is satisfied with respect to the recognized size or shape and each of the plurality of items of size/shape information.

4. The product registration apparatus according to claim 1, wherein the processor is further configured to execute the instructions to implement an imaging unit that captures the image in accordance with a timing at which the code acquisition unit reads the product identification code.

5. The product registration apparatus according to claim 1, wherein the processor is further configured to execute the instructions to implement a number acquisition unit that acquires the number of products included in the imaging range, wherein the determination unit determines whether the acquired number of product identification codes match the acquired number of products.

6. The product registration apparatus according to claim 1, wherein the product identification code is further linked with a weight or a weight deviation of the product of the product identification code, and the determination unit executes the determination in at least any one of:

a case where the weight linked with the acquired product identification code is equal to or greater than a reference value;

a case where the weight linked with the acquired product identification code is not set; and a case where the weight deviation linked with the acquired product identification code is equal to or greater than a predetermined threshold.

7. The product registration apparatus to claim 1, wherein the processor is further configured to execute the instructions to implement an output unit that provides a notification to an output device when the predetermined reference is not satisfied.

8. A control method executed by a computer, the method comprising:

recognizing, using an image associated with depth information indicating a depthwise distance of a product included in an imaging range, a size or shape of the product within the image;

acquiring a product identification code of a product to be checked out;

acquiring size/shape information linked with the acquired product identification code; and determining, by calculating a difference between the size or shape of the product recognized from the image and the size/shape information acquired using the product identification code, whether the difference satisfies a predetermined reference.

9. A non-transitory computer readable medium storing a program causing a computer to execute a method, the method comprising:

recognizing, using an image associated with depth information indicating a depthwise distance of a product included in an imaging range, a size or shape of the product within the image;

acquiring a product identification code of a product to be checked out;

acquiring size/shape information linked with the acquired product identification code; and determining, by calculating a difference between the size or shape of the product recognized from the image and the size/shape information acquired using the product identification code, whether the difference satisfies a predetermined reference.

* * * * *